United States Patent
Neemuchwala et al.

(10) Patent No.: US 7,751,626 B2
(45) Date of Patent: Jul. 6, 2010

(54) METHOD AND APPARATUS FOR DETECTION USING GRADIENT-WEIGHTED AND/OR DISTANCE-WEIGHTED GRAPH CUTS

(75) Inventors: Huzefa Neemuchwala, Mountain View, CA (US); Daniel Russakoff, Mountain View, CA (US)

(73) Assignee: Fujifilm Corporation, Tokyo (JP)

( * ) Notice: Subject to any disclaimer, the term of this patent is extended or adjusted under 35 U.S.C. 154(b) by 882 days.

(21) Appl. No.: 11/633,534

(22) Filed: Dec. 5, 2006

(65) Prior Publication Data

US 2008/0130977 A1 Jun. 5, 2008

(51) Int. Cl.
G06K 9/46 (2006.01)
G06K 9/00 (2006.01)
G06K 9/34 (2006.01)
(52) U.S. Cl. .................. 382/203; 382/132; 382/173
(58) Field of Classification Search ......... 382/128–132, 382/173, 199, 203–204
See application file for complete search history.

(56) References Cited

U.S. PATENT DOCUMENTS 6,973,212 B2 * 12/2005 Boykov et al. ............... 382/173
2006/0285747 A1 * 12/2006 Blake et al. .................. 382/180
2006/0291721 A1 * 12/2006 Torr et al. .................... 382/173

OTHER PUBLICATIONS

Boykov et al., IEEE Transactions on PAMI, vol. 26, No. 9, pp. 1124-1137, Sep. 2004.
Kwok et al., IEEE Transactions on Medical Imaging, vol. 23, No. 9, pp. 1129-1140, Sep. 2004.

* cited by examiner

*Primary Examiner*—Daniel G Mariam
(74) *Attorney, Agent, or Firm*—Birch, Stewart, Kolasch & Birch, LLP

(57) ABSTRACT

Methods and apparatuses process images. The method according to one embodiment accesses digital image data representing an image including an object; generates a connected graph associated with the image, the generating step including representing pixels of the image in a higher than two dimensional space to obtain pixel representations, generating a pixel representation graph using the pixel representations, and assigning weights to edges between the pixel representations in the pixel representation graph, based on a gradient characteristic between the pixel representations, to obtain a connected graph; and segments the connected graph using an energy minimizing function, to obtain pixels of the image associated with the object.

28 Claims, 9 Drawing Sheets

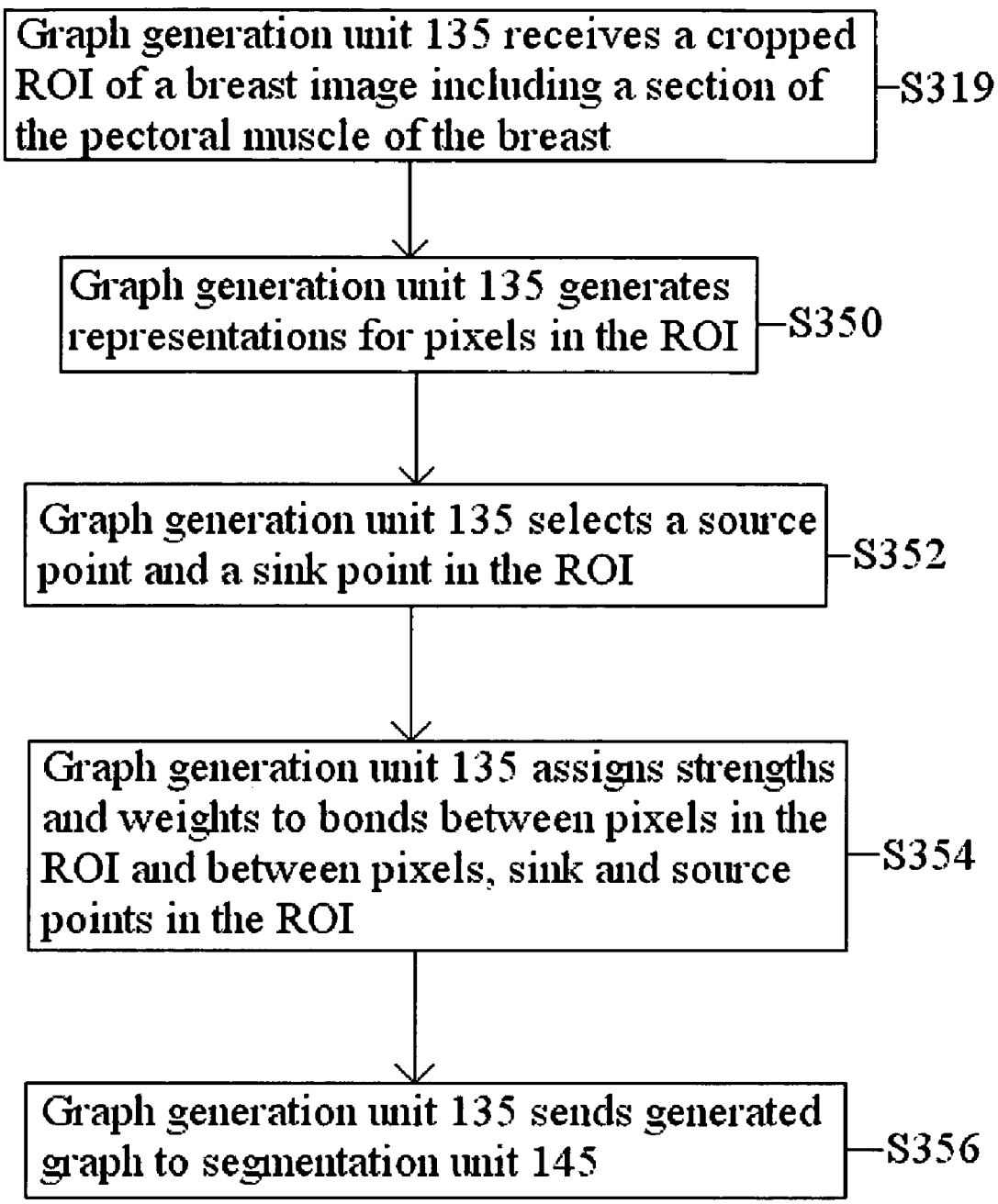

METHOD AND APPARATUS FOR DETECTION USING GRADIENT-WEIGHTED AND/OR DISTANCE-WEIGHTED GRAPH CUTS

CROSS REFERENCE TO RELATED APPLICATION

This non-provisional application is related to co-pending non-provisional application titled "Method and Apparatus for Detection Using Cluster-Modified Graph Cuts" filed concurrently herewith, the entire contents of which are hereby incorporated by reference.

BACKGROUND OF THE INVENTION

1. Field of the Invention

The present invention relates to a digital image processing technique, and more particularly to a method and apparatus for processing and segmenting areas in images.

2. Description of the Related Art

Mammography images are powerful tools used in the diagnosis of medical problems of breasts. An important feature in mammography images is the pectoral muscle area. The pectoral muscle area can be used to identify breast abnormalities, can facilitate comparative analysis and processing of mammography images, can convey significant information relating to breast position and deformation, etc.

For example, the pectoral muscle in the medio-lateral view, as is typically shown in mammograms, is a major landmark for mammogram reconstruction and registration. The pectoral muscle also helps quantify quality of mammograms and can be used for automatic quality assurance. The area overlying the pectoral muscle is a highly suspicious zone for development of masses and is checked by radiologists for false-negatives (non-cancerous areas). Also, mammographic parenchymal patterns, which are a marker of breast cancer risk, and the pectoral muscle have identical texture, which leads to false-positives in detection of malignant masses.

Pectoral muscle identification is a non-trivial task due to variability of borders and contrast, and unclear areas in breast images. Typical/conventional methods to detect the pectoral muscle rely on some heuristic gradient measures to fit a line to the pectoral muscle boundary. One such pectoral muscle detection technique is described in the publication "Automatic Pectoral Muscle Segmentation on Mediolateral Oblique View Mammograms", by S. Kwok, R. Chandrasekhar, Y. Attikiouzel and M. Rickard, IEEE Transactions on Medical Imaging v.23 No. 9, September 2004. In the technique described in this publication, an adaptive algorithm is proposed to automatically extract the pectoral muscle in digitized mammograms. The adaptive algorithm uses knowledge about the position and shape of the pectoral muscle on medio-lateral oblique views. The pectoral edge is first estimated by a straight line that is validated for correctness of location and orientation. The linear estimate is then refined using iterations. This technique, however, relies on detailed pre-operational knowledge of the digital data, to tune algorithms for the data at hand, and requires adjustments of many parameters. This technique force-fits a line or curve to the pectoral muscle boundary, even though the boundary may not be amenable to curve fitting.

Disclosed embodiments of this application address these and other issues by using a method and an apparatus for pectoral muscle detection using gradient-weighted and/or distance weighted graph cuts. The method and apparatus segment graphs associated with breast images, to obtain pixels associated with the pectoral muscle. The method and apparatus are applicable to breast images with various views, and do not require tuning beforehand. The method and apparatus are applicable to other types of images besides breast images, and detect various objects included in images.

SUMMARY OF THE INVENTION

The present invention is directed to methods and apparatuses for processing images. According to a first aspect of the present invention, an image processing method comprises: accessing digital image data representing an image including an object; generating a connected graph associated with the image, the generating step including representing pixels of the image in a higher than two dimensional space to obtain pixel representations, generating a pixel representation graph using the pixel representations, and assigning weights to edges between the pixel representations in the pixel representation graph, based on a gradient characteristic between the pixel representations, to obtain a connected graph; and segmenting the connected graph using an energy minimizing function, to obtain pixels of the image associated with the object.

According to a second aspect of the present invention, an image processing method comprises: accessing digital image data representing an image including an object; generating a connected graph associated with the image, the generating step including representing pixels of the image to obtain pixel representations, generating a pixel representation graph using the pixel representations, and assigning weights to edges between the pixel representations in the pixel representation graph, based on a gradient characteristic between the pixel representations, to obtain a connected graph; and segmenting the connected graph using an energy minimizing function, to obtain pixels of the image associated with the object.

According to a third aspect of the present invention, an apparatus for processing images comprises: an image data input unit for accessing digital image data representing an image including an object; a graph generation unit for generating a connected graph associated with the image, the graph generation unit generating a connected graph by representing pixels of the image to obtain pixel representations, generating a pixel representation graph using the pixel representations, and assigning weights to edges between the pixel representations in the pixel representation graph, based on a gradient characteristic between the pixel representations, to obtain a connected graph; and a segmentation unit for segmenting the connected graph using a max-flow segmentation to obtain pixels of the image associated with the object.

BRIEF DESCRIPTION OF THE DRAWINGS

Further aspects and advantages of the present invention will become apparent upon reading the following detailed description in conjunction with the accompanying drawings, in which:

FIG. 6 is a flow diagram illustrating operations performed by a graph generation unit included in an image processing unit for detection using weighted graph cuts according to an embodiment of the present invention illustrated in FIG. 2;

DETAILED DESCRIPTION

Figure 1:
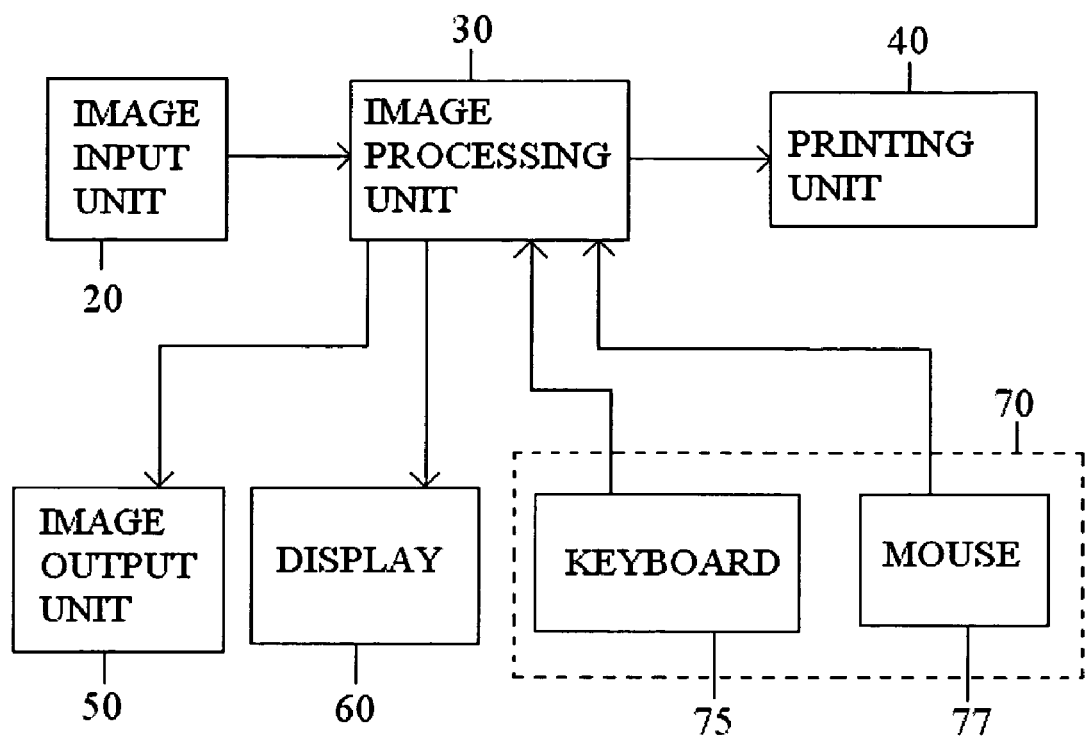
FIG. 1 is a general block diagram of a system including an image processing unit for detection using weighted graph cuts according to an embodiment of the present invention.

Aspects of the invention are more specifically set forth in the accompanying description with reference to the appended figures. FIG. 1 is a general block diagram of a system including an image processing unit for detection using weighted graph cuts according to an embodiment of the present invention. The system 100 illustrated in FIG. 1 includes the following components: an image input unit 20; an image processing unit 30; a display 60; an image output unit 50; a user input unit 70; and a printing unit 40. Operation of the system 100 in FIG. 1 will become apparent from the following discussion.

The image input unit 20 provides digital image data. The digital image data may be a medical image, a mammography image, an image of people, etc. Image input unit 20 may be one or more of any number of devices providing digital image data derived from a radiological film, a diagnostic image, a digital system, etc. Such an input device may be, for example, a scanner for scanning images recorded on a film; a digital camera; a digital mammography machine; a recording medium such as a CD-R, a floppy disk, a USB drive, etc.; a database system which stores images; a network connection; an image processing system that outputs digital image data, such as a computer application that processes images; etc.

The image processing unit 30 receives digital image data from the image input unit 20 and performs object detection using weighted graph cuts in a manner discussed in detail below. A user, e.g., a radiology specialist at a medical facility, may view the output of image processing unit 30, via display 60 and may input commands to the image processing unit 30 via the user input unit 70. In the embodiment illustrated in FIG. 1, the user input unit 70 includes a keyboard 75 and a mouse 77, but other conventional input devices could also be used.

In addition to performing detection using weighted graph cuts in accordance with embodiments of the present invention, the image processing unit 30 may perform additional image processing functions in accordance with commands received from the user input unit 70. The printing unit 40 receives the output of the image processing unit 30 and generates a hard copy of the processed image data. In addition or as an alternative to generating a hard copy of the output of the image processing unit 30, the processed image data may be returned as an image file, e.g., via a portable recording medium or via a network (not shown). The output of image processing unit 30 may also be sent to image output unit 50 that performs further operations on image data for various purposes. The image output unit 50 may be a module that performs further processing of the image data, a database that collects and compares images, etc.

Figure 2:
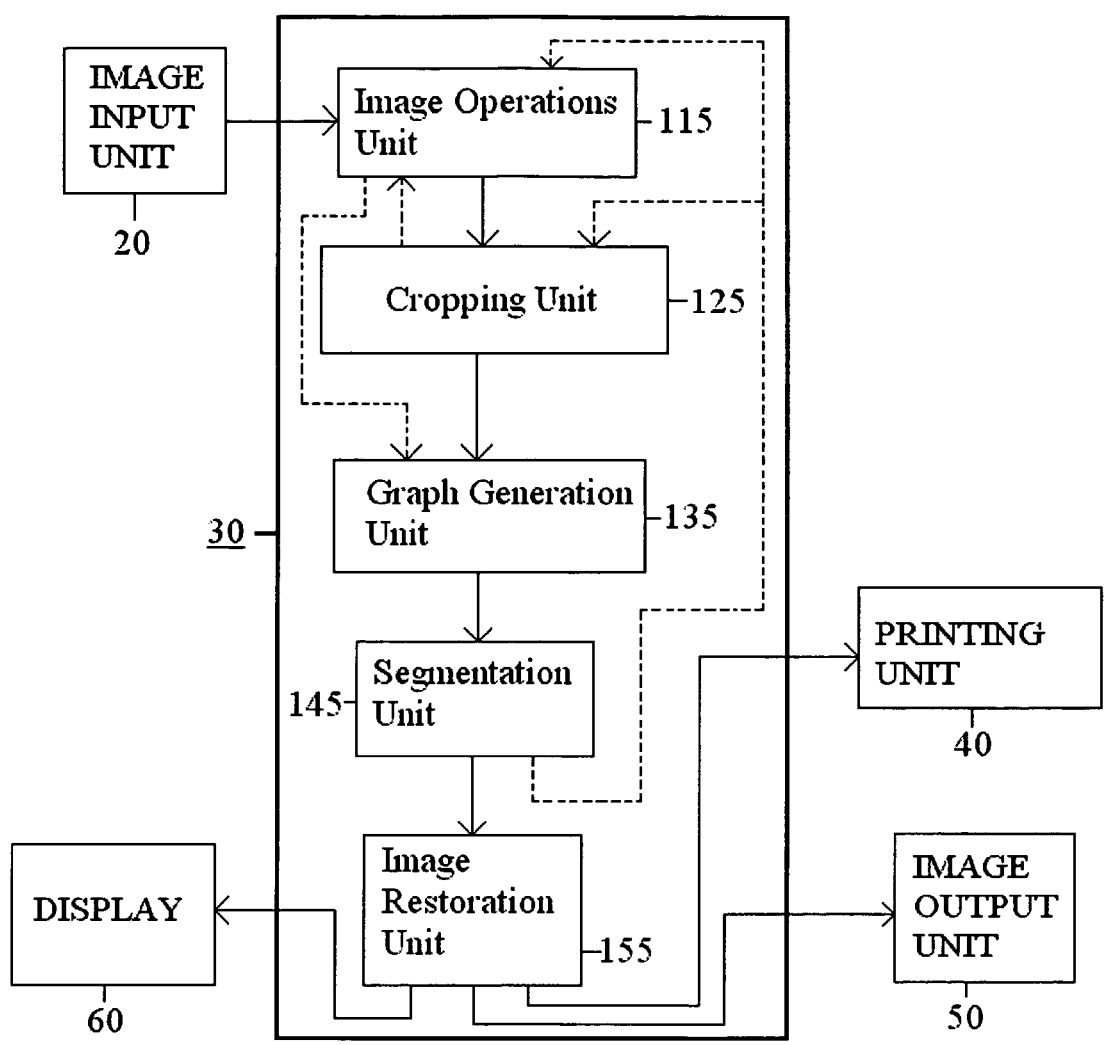
FIG. 2 is a block diagram illustrating in more detail aspects of the image processing unit for detection using weighted graph cuts according to an embodiment of the present invention.

FIG. 2 is a block diagram illustrating in more detail aspects of the image processing unit 30 for detection using weighted graph cuts according to an embodiment of the present invention. As shown in FIG. 2, the image processing unit 30 according to this embodiment includes: an image operations unit 115; a cropping unit 125; a graph generation unit 135; a segmentation unit 145; and an image restoration unit 155. Although the various components of FIG. 2 are illustrated as discrete elements, such an illustration is for ease of explanation and it should be recognized that certain operations of the various components may be performed by the same physical device, e.g., by one or more microprocessors.

Generally, the arrangement of elements for the image processing unit 30 illustrated in FIG. 2 performs preprocessing and preparation of digital image data, generation of graphs for the digital image data, and detection of various areas in the digital image data using the generated graphs. Operation of image processing unit 30 will be next described in the context of mammography images, for detection of pectoral muscle areas. However, the principles of the current invention apply equally to other areas of image processing, and to detection of other types of objects in digital image data.

Image operations unit 115 receives a mammography image from image input unit 20 and may perform preprocessing and preparation operations on the mammography image. Preprocessing and preparation operations performed by image operations unit 115 may include resizing, cropping, compression, color correction, etc., that change size and/or appearance of the mammography image.

Image operations unit 115 sends the preprocessed mammography image to cropping unit 125, which crops a part of the mammography image. Graph generation unit 135 receives a cropped section of the mammography image and generates a graph associated with the cropped section, after which segmentation unit 145 segments the graph to obtain an area of the pectoral muscle in the mammography image. Finally, image restoration unit 155 outputs a breast image with identified pectoral muscle pixels. Image restoration unit 155 may also send results of pectoral area segmentation back to cropping unit 125 or to image operations unit 115, for refinement of results of pectoral muscle detection.

The output of image restoration unit 155 may be sent to image output unit 50, printing unit 40, and/or display 60.

Operation of the components included in the image processing unit 30 illustrated in FIG. 2 will be next described with reference to FIGS. 3-9.

Image operations unit 115, cropping unit 125, graph generation unit 135, segmentation unit 145, and image restoration unit 155 are software systems/applications. Image operations unit 115, cropping unit 125, graph generation unit 135, segmentation unit 145, and image restoration unit 155 may also be purpose built hardware such as FPGA, ASIC, etc.

Figure 3:
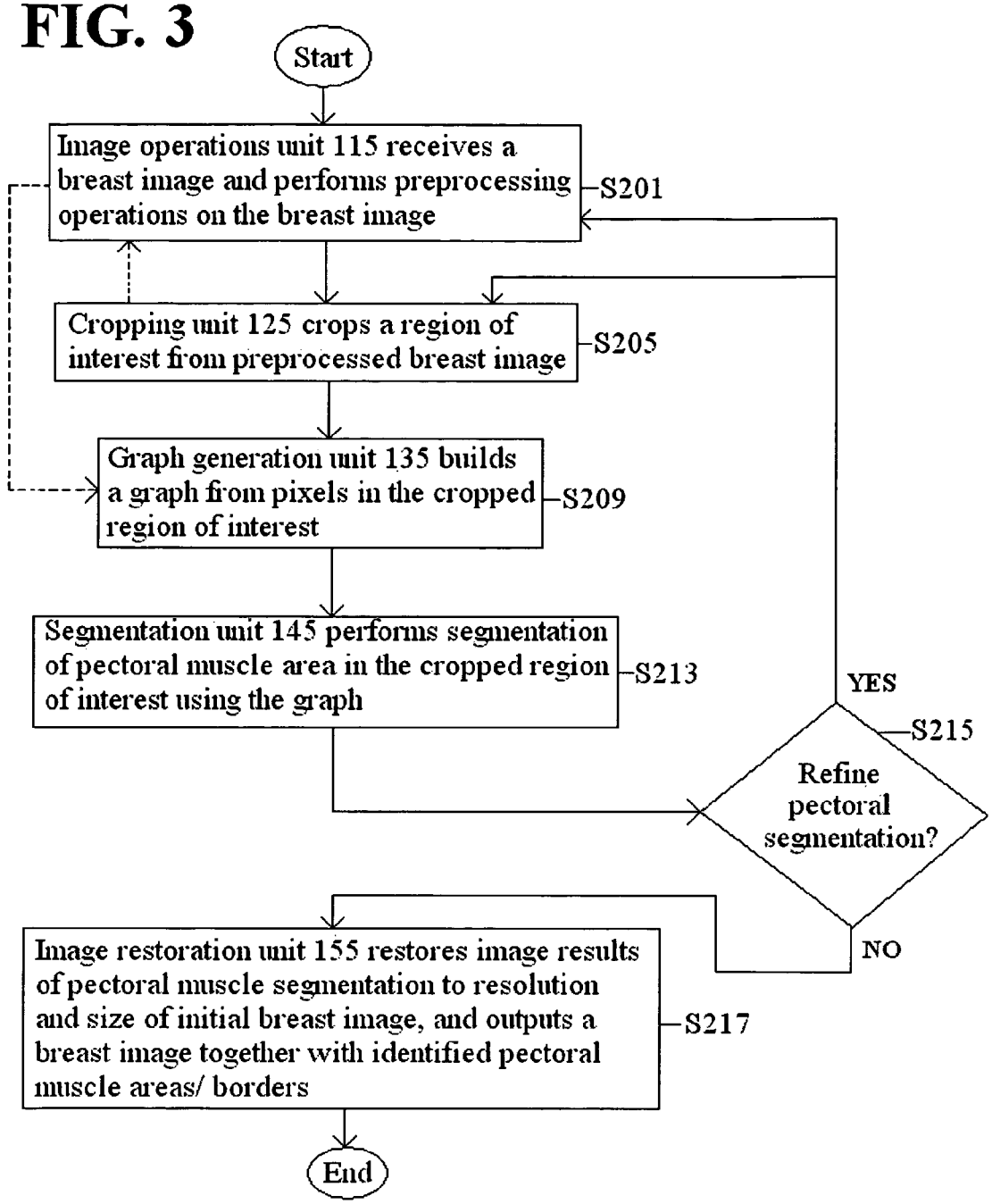
FIG. 3 is a flow diagram illustrating operations performed by an image processing unit for detection using weighted graph cuts according to an embodiment of the present invention illustrated in FIG. 2.

FIG. 3 is a flow diagram illustrating operations performed by an image processing unit 30 for detection using weighted graph cuts according to an embodiment of the present invention illustrated in FIG. 2. Image operations unit 115 receives a raw or a preprocessed breast image from image input unit 20, and performs preprocessing operations on the breast image (S201). Preprocessing operations may include resizing, smoothening, compression, color correction, etc. Cropping unit 125 receives the preprocessed breast image and crops a region of interest from the preprocessed breast image (S205). The cropped region of interest is then sent to graph generation unit 135. The cropped region of interest may instead be sent back to image operations unit 115 for more preprocessing operations, after which it is sent to graph generation unit 135. Graph generation unit 135 builds a graph from pixels in the cropped region of interest (S209). Segmentation unit 145 receives the cropped region of interest with the graph from graph generation unit 135, and performs segmentation of the pectoral muscle area in the cropped region of interest, using the associated graph (S213). Segmentation of the pectoral muscle area in the cropped region of interest places pixels from the cropped region of interest into sets. Some of the sets are associated with the pectoral muscle, while other sets are associated with non-muscle areas, such as non-muscle breast areas, background areas, etc.

Segmentation unit 145 then performs a test to determine whether a refinement of the pectoral segmentation is to be performed, based on the current segmentation results (S215). If a refinement of the pectoral segmentation is to be performed, the cropped region of interest is sent back to cropping unit 125 or to image operations unit 115. Cropping unit 125 may then crop a different region of interest from the breast image, image operations unit 115 may perform additional or new image processing operations on the breast image or on the region of interest, graph generation unit 135 may build a graph from pixels in the region of interest again. Segmentation unit 145 then performs segmentation of the pectoral muscle area again.

Image restoration unit 155 receives the image results of pectoral muscle segmentation from segmentation unit 145, restores the received image to the full resolution and size of the initial breast image, and outputs a breast image together with identified pectoral muscle areas/borders (S217). The output of image restoration unit 155 may be sent to image output unit 50, printing unit 40, and/or display 60.

Figure 4:
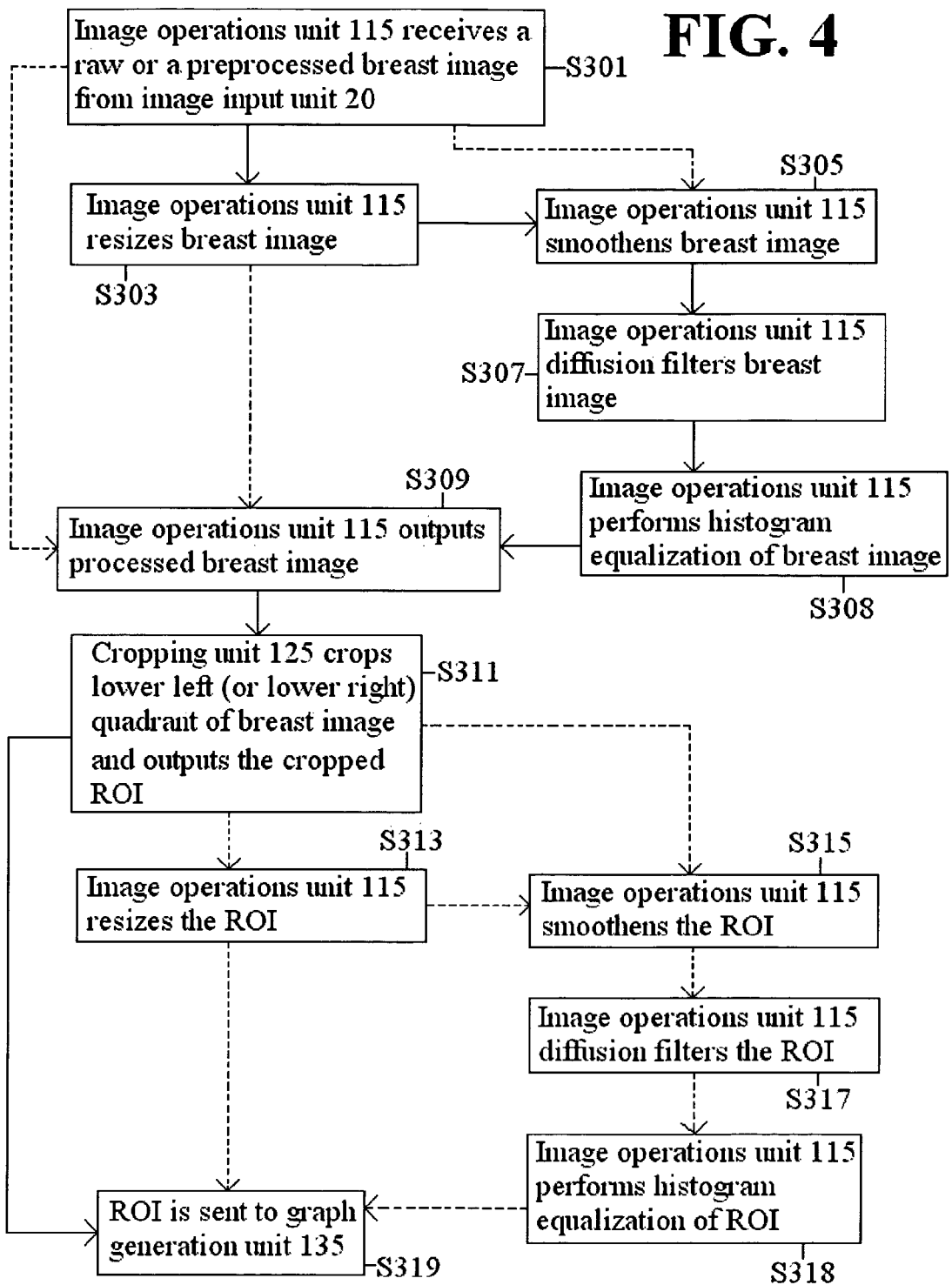
FIG. 4 is a flow diagram illustrating exemplary image processing operations performed by an image operations unit and a cropping unit included in an image processing unit for detection using weighted graph cuts according to an embodiment of the present invention illustrated in FIG. 2.

FIG. 4 is a flow diagram illustrating exemplary image processing operations performed by an image operations unit 115 and a cropping unit 125 included in an image processing unit 30 for detection using weighted graph cuts according to an embodiment of the present invention illustrated in FIG. 2. The flow diagram in FIG. 4 illustrates exemplary details of steps S201 and S205 from FIG. 3.

Image operations unit 115 receives a raw or a preprocessed breast image from image input unit 20 (S301) and resizes the breast image (S303) in order to speed up subsequent processing of the breast image. In an exemplary implementation, mammogram images at 100 um resolution received by image operations unit 115 are resized to 800 um. The resized breast image is then smoothened by image operations unit 115 to reduce noise (S305), diffusion filtered to avoid loss of high spatial frequency information (S307), and histogram equalized (S308). Image operations unit 115 then outputs a processed breast image (S309). Cropping unit 125 receives the processed breast image from image operations unit 115, and crops a section of the processed breast image where the pectoral muscle is likely to be located (S311). For mammograms showing MLL/MLR views of the breast, the lower left or lower right portion/quadrant of the breast image is cropped out, as the pectoral muscle is located in one of these areas. In an exemplary set of mammograms, the cropped lower left or lower right area spans about ½ height and ⅓ width of the total mammogram. For other views of mammograms, different sections of the breast image may be cropped. The cropped area is the region of interest (ROI) output by cropping unit 125. The ROI is then sent to graph generation unit 135 (S319).

Alternative sequences for processing of the breast image may also be performed. For example, steps S303, S305, S307 and S308 may be skipped for the full breast image, with resizing, smoothening, diffusion filtering, and histogram equalization performed for the ROI image, in steps S313 (resizing of ROI), S315 (smoothening of ROI), S317 (diffusion filtering of ROI), and S318 (histogram equalization of the ROI). In another sequence, resizing can be performed for the full breast image (S303), while smoothening, diffusion filtering, and histogram equalization are performed for the ROI image (S315, S317, S318). In another sequence, smoothening, diffusion filtering, and histogram equalization can be performed for the full breast image (S305, S307, S308), while resizing is performed for the ROI image (S313). In yet another sequence, resizing and/or smoothening, diffusion filtering, and histogram equalization may be performed for both the full breast image and the ROI image. In an exemplary implementation, the original breast image, or the ROI image is smoothened with a 3×3 Gaussian window to reduce shot noise (steps S305 or S315). At the end of the sequences shown in FIG. 4, the ROI is sent to graph generation unit 135 (S319).

In an exemplary implementation, the ROI resolution is reduced to 1/16th of its original resolution, in step S313.

Figure 5A:
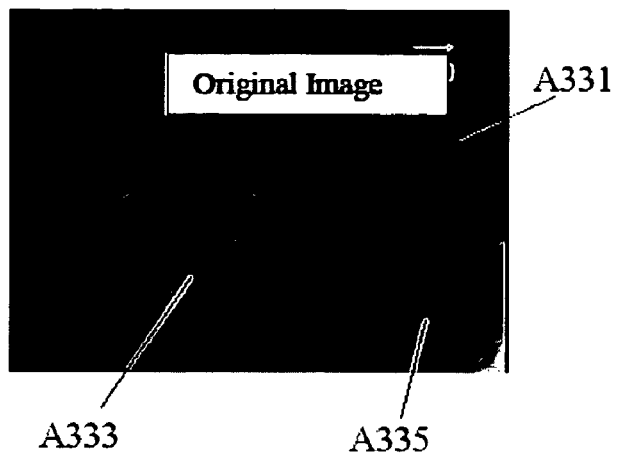
FIG. 5A illustrates an exemplary mammogram image.

FIG. 5A illustrates an exemplary mammogram image. The breast image I330 in FIG. 5A illustrates a breast and a pectoral muscle section visible in the breast image. In the breast image I330, A333 is a breast area, A335 is an area of the pectoral muscle, and A331 is the background.

Figure 5B:
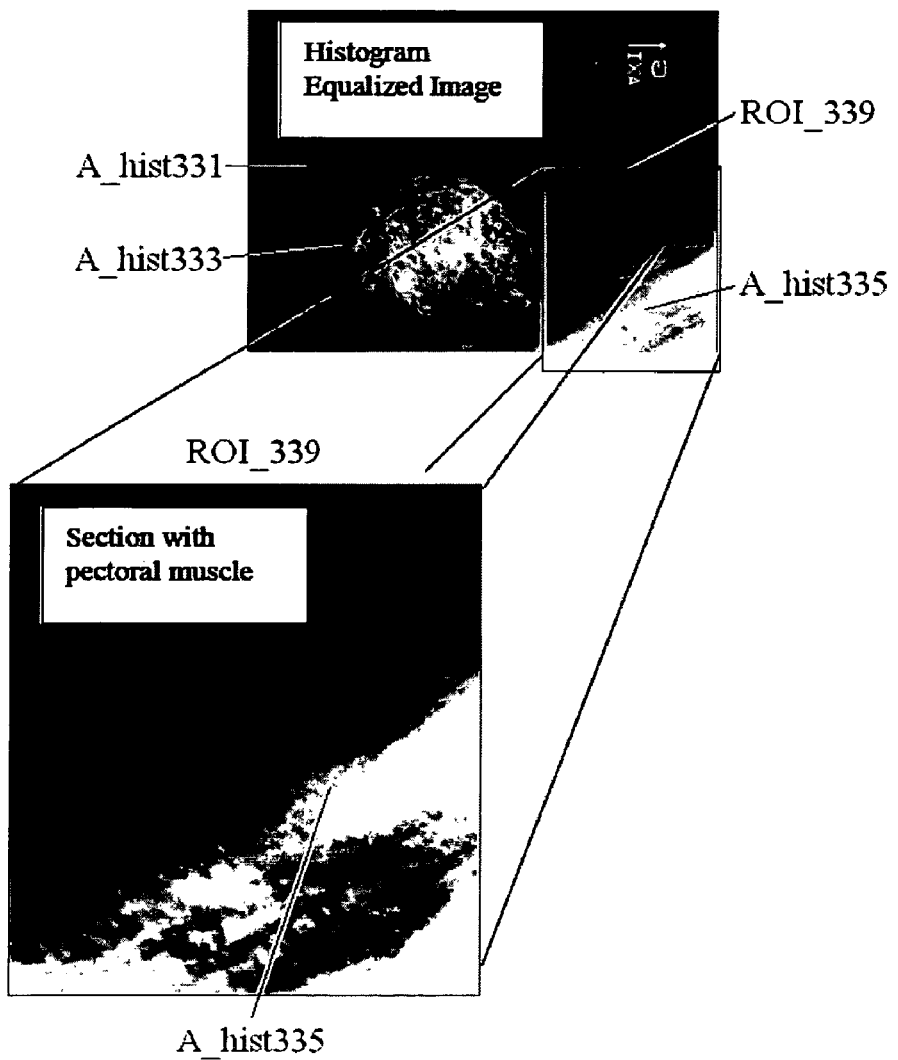
FIG. 5B illustrates exemplary mammogram images obtained after image processing operations and cropping according to an embodiment of the present invention illustrated in FIG. 4.

FIG. 5B illustrates exemplary mammogram images obtained after image processing operations and cropping according to an embodiment of the present invention illustrated in FIG. 4. The mammogram images shown in FIG. 5B are outputs of image operations unit 115 and cropping unit 125 for the input breast image I330 of FIG. 5A.

Breast image I338 is output from image operations unit 115 after histogram equalization of original image I330. In the histogram equalized breast image I338, A_hist333 is the breast area after histogram equalization, A_hist335 is the pectoral muscle area after histogram equalization, and A_hist331 is the background. Cropping unit 125 next crops a region of interest ROI_339 from histogram equalized image I338. The region of interest ROI_339 is chosen to include the pectoral muscle area A_hist335. ROI_339 is magnified at the bottom of FIG. 5B, to show the area of the pectoral muscle A_hist335.

FIG. 6 is a flow diagram illustrating operations performed by a graph generation unit 135 included in an image processing unit 30 for detection using weighted graph cuts according to an embodiment of the present invention illustrated in FIG. 2. The flow diagram in FIG. 6 describes details of step S209 in FIG. 3. Graph generation unit 135 receives a cropped region of interest (ROI) of a breast image from cropping unit 125 or from image operations unit 115, as described in FIG. 4. The ROI includes an area of the breast image with a section of the pectoral muscle of the breast. Graph generation unit 135 generates representations for the pixels in the ROI (S350). The pixel representations may be 2-dimensional representations, or higher-dimensional representations. Graph generation unit 135 next selects a source point and a sink point in the ROI (S352). Graph generation unit 135 assigns strengths and weights to bonds between pixels in the ROI, including bonds between pixels, sink and source points in the ROI, using the pixel representations, the source point location, and the sink point location (S354). The graph including the pixels in the ROI, the strengths and weights assigned to the bonds between the ROI pixels, and the sink and source points, is then sent to segmentation unit 145 (S356).

Figure 7A:
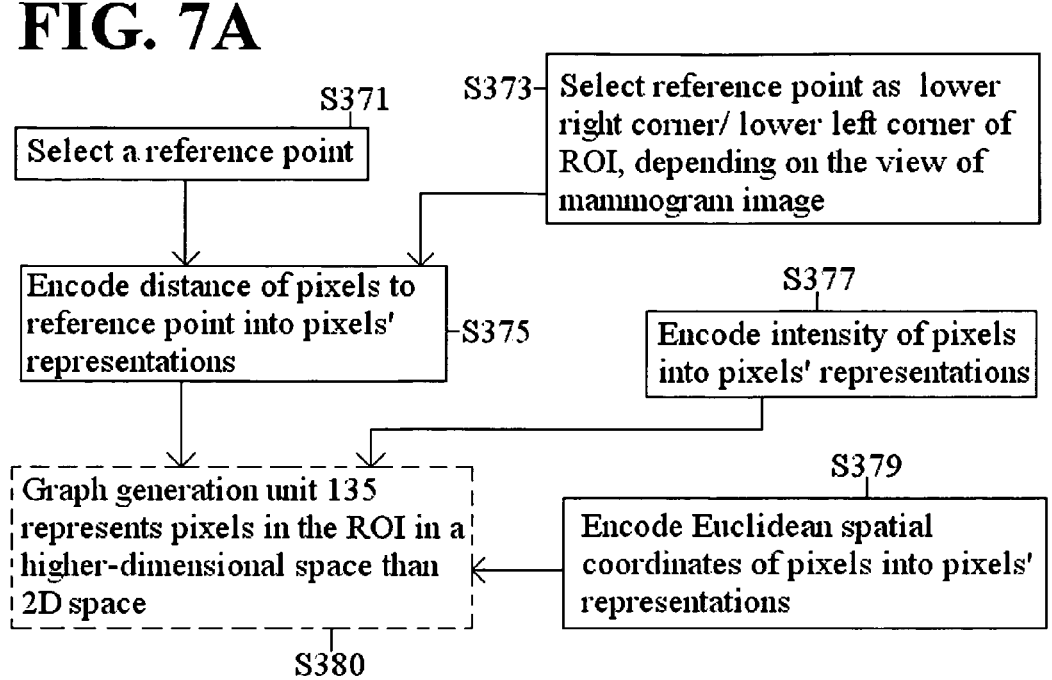
FIG. 7A is a flow diagram illustrating exemplary operations for representation of pixels for a region of interest by a graph generation unit included in an image processing unit for detection using weighted graph cuts according to an embodiment of the present invention illustrated in FIG. 6.

FIG. 7A is a flow diagram illustrating exemplary operations for representation of pixels for a region of interest by a graph generation unit 135 included in an image processing unit 30 for detection using weighted graph cuts according to an embodiment of the present invention illustrated in FIG. 6. The flow diagram in FIG. 7A illustrates exemplary details of step S350 from FIG. 6. Pixels representations generated in step S350 from FIG. 6 may be 2-dimensional, or higher-dimensional.

In an exemplary implementation, pixels in the ROI are optionally represented in a higher-dimensional space than the 2D representation in image space (S380). In this higher-dimensional space, pixels' representations encode more properties of pixels, besides the intensity of pixels. A pixel can, for example, be represented in a 4-dimensional space by Euclidean spatial coordinates, intensity, and distance from a reference point (S379, S377, S375, S371). The reference point can be the lower right corner or the lower left corner of the ROI, depending on the view of the mammogram image from which the ROI was extracted (S373). The reference point may be chosen as a pixel likely to belong to the pectoral muscle. 4-dimensional pixel representations are obtained for all pixels in the ROI.

The Euclidean spatial coordinates may be x and y coordinates, polar coordinates, cylindrical coordinates, etc. Other higher or lower dimensional representations of pixels, which encode more properties/parameters or fewer properties/parameters than the pixel properties/parameters mentioned above, may also be obtained.

Figure 7B:
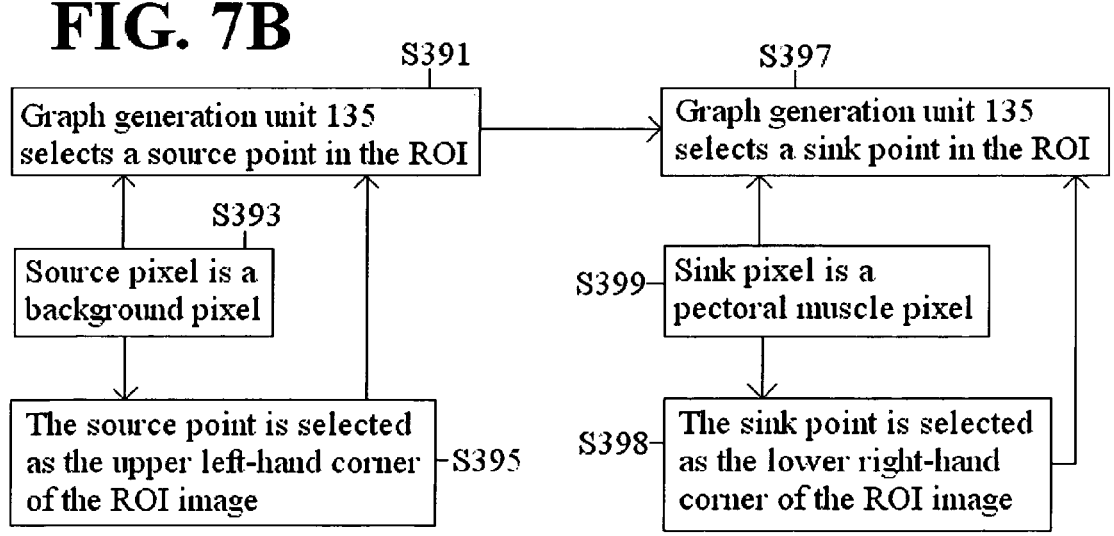
FIG. 7B is a flow diagram illustrating exemplary operations for selection of a source point and a sink point in a region of interest by a graph generation unit included in an image processing unit for detection using weighted graph cuts according to an embodiment of the present invention illustrated in FIG. 6.

FIG. 7B is a flow diagram illustrating exemplary operations for selection of a source point and a sink point in a region of interest by a graph generation unit 135 included in an image processing unit 30 for detection using weighted graph cuts according to an embodiment of the present invention illustrated in FIG. 6. The flow diagram in FIG. 7B illustrates exemplary details of step S352 from FIG. 6.

To isolate the pectoral muscle from the background in a breast image, image processing unit 30 can cut the image along the pectoral muscle boundary. While this may be achieved by following local gradients, the resulting pectoral muscle segmentation may be poor. To obtain a better segmentation of the pectoral muscle, a global perspective that follows the physical contours of the pectoral muscle can be used. The representations of pixels obtained at step S350 in FIG. 6 are used in the determination of contours of the pectoral muscle, because isolating the pectoral muscle can be reduced to isolating the pixels in the pectoral muscle in the pixel representation space. The pixel representation space may be, for example, a 2-dimensional space, a 4-dimensional space as described at FIG. 7A, etc.

The analogy of water flowing from a mountaintop to a lake in a valley can be used for segmentation of objects. Flowing water follows the path of least resistance, where a maximum flow can be achieved. Similarly, segmentation of objects can be driven from a source (an arbitrary pixel in the background) to a sink (an arbitrary spot in the pectoral muscle). The source and sink can be interchanged without consequences for the resulting segmentation.

Graph generation unit 135 selects a source pixel and a sink pixel in the ROI (S391 and S397). The source pixel can be automatically selected as a pixel that is most likely a background pixel and not a pectoral muscle pixel (S393). The sink pixel can be automatically selected as a pixel that is most likely a pectoral muscle pixel (S399). For example, in breast images shown in FIGS. 5A and 5B, or breast images showing similar views to the views in FIGS. 5A-5B, the source point can be selected as the upper left-hand corner of the ROI image (S395), and the sink point can be selected as the lower right-hand corner of the ROI image (S398).

Figure 7C:
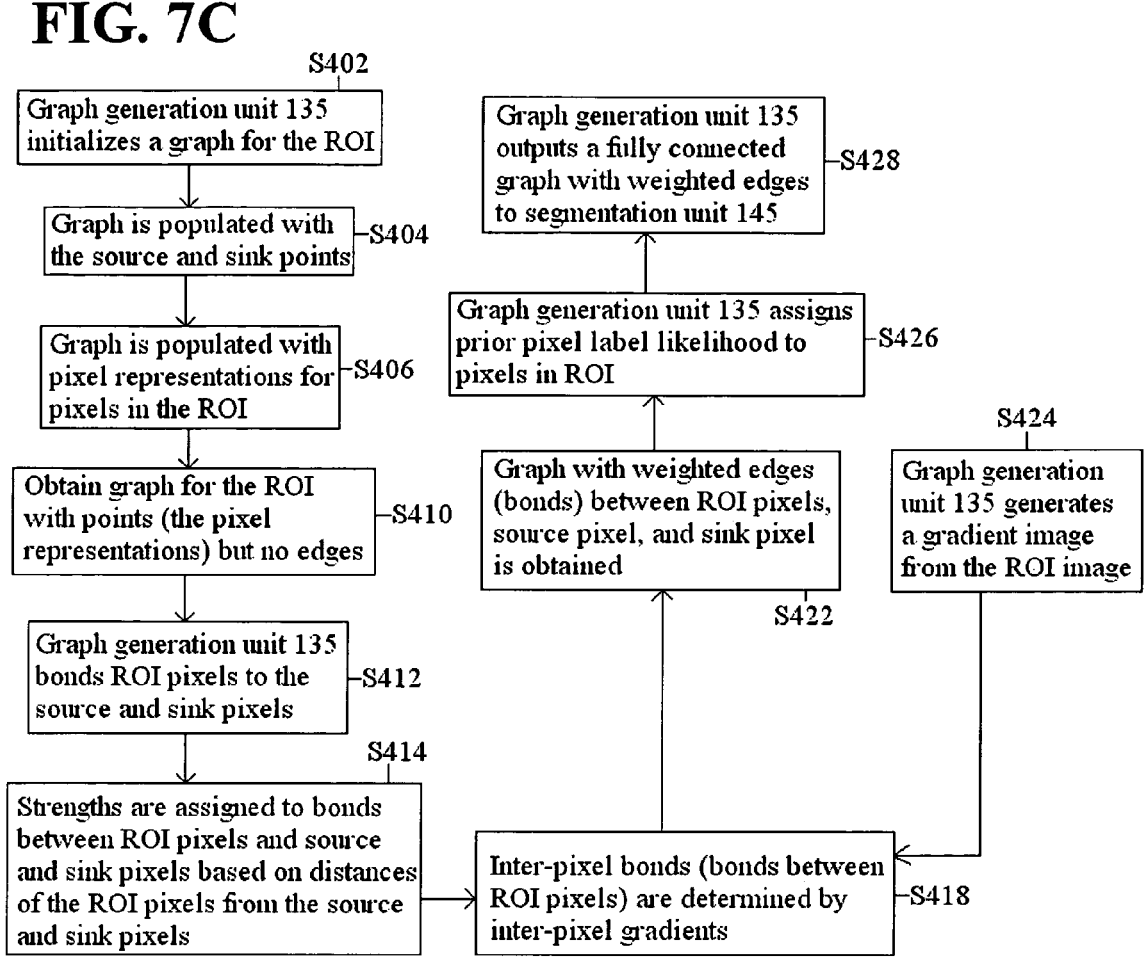
FIG. 7C is a flow diagram illustrating exemplary operations for creating a graph with weighted edges for a region of interest by a graph generation unit included in an image processing unit for detection using weighted graph cuts according to an embodiment of the present invention illustrated in FIG. 6.

FIG. 7C is a flow diagram illustrating exemplary operations for creating a graph with weighted edges for a region of interest by a graph generation unit 135 included in an image processing unit 30 for detection using weighted graph cuts according to an embodiment of the present invention illustrated in FIG. 6. The flow diagram in FIG. 7C illustrates exemplary details of step S354 from FIG. 6.

Graph generation unit 135 initializes a graph for the region of interest (S402). The graph is first populated (S404) with the source and sink pixels obtained in step S352 of FIG. 6, or, in an exemplary implementation, the source and sink points obtained as shown in FIG. 7B. The graph is then populated with the pixel representations for the pixels in the ROI (S406). Graph generation unit 135 uses the pixel representations generated in step S350 of FIG. 6 for the ROI pixels together with the source and sink pixels. In an exemplary implementation, graph generation unit 135 uses the higher-dimensional pixel representations derived as described in FIG. 7A, for the ROI pixels together with the source and sink pixels. At this point, the graph for the ROI contains points, or nodes (the pixel representations) but no edges (S410).

Graph generation unit 135 next bonds each ROI pixel to the source and sink pixels (S412). Strengths are assigned to the bonds between ROI pixels and the source and sink pixels (S414). The strength of a bond (link or edge) between an ROI pixel and the source pixel is determined based on the distance from the ROI pixel to the source pixel (S414). The strength of a bond (link or edge) between an ROI pixel and the sink pixel is determined based on the distance from the ROI pixel to the sink pixel (S414).

Figure 8:
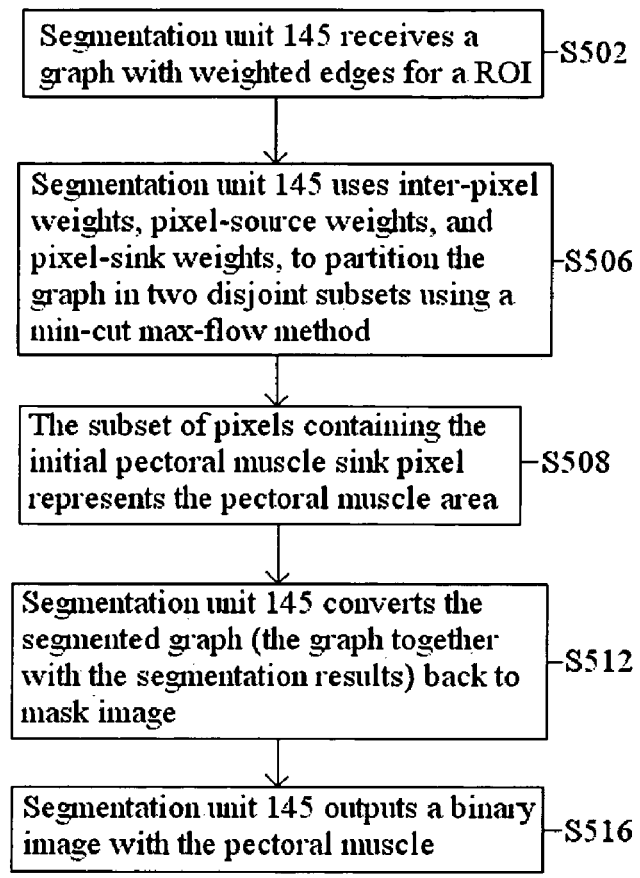
FIG. 8 is a flow diagram illustrating operations performed by a segmentation unit included in an image processing unit for detection using weighted graph cuts according to an embodiment of the present invention illustrated in FIG. 2.

Segmentation of the pectoral muscle area in the ROI, which is described in FIG. 8, will place pixels from the ROI into sets. Some of the sets will be associated with the pectoral muscle, while other sets will be associated with non-muscle areas, such as non-muscle breast areas, background areas, etc. The strength of bonds based on distances of ROI pixels to source and sink pixels describe the fact that the closer a ROI pixel is to the source pixel, the more likely it is that the ROI pixel is in the same set as the source pixel. Similarly, the closer a ROI pixel is to the sink pixel, the more likely it is that the ROI pixel is in the same set as the sink pixel.

Graph generation unit 135 then creates bonds between ROI pixels (S418). Inter-pixel bonds (strength of bonds between ROI pixels) are determined using values of inter-pixel gradients. Additionally or alternatively, spatial distances and gradients may be used together, to form a measure of inter-pixel distance in a higher dimensional space.

Gradients between pixels are determined by generating a gradient image from the ROI image (S424). The gradient image contains gradient values between pixels, and is generated using pixel intensity information in the original mammogram. The gradient image is then used together with the ROI image to weight the strength of the bonds between pixels. A graph with weighted edges (bonds) between ROI pixels, source pixel, and sink pixel is obtained (S422).

Next, graph generation unit 135 assigns prior pixel label likelihood to pixels in ROI (S426). Prior pixel likelihoods are obtained by a mathematical relationship between the pixel location and the source (or sink). A pixel is more likely to be a source (or sink) if it is physically closer to the source (sink). If 'L' represents the prior likelihood of the pixel being of the same class as source, that is, of the class of background pixels, then '1/L' is the likelihood that the pixel is of the same class as the sink. To calculate L (prior likelihood for the pixel belonging to class 'source'), let ds be the distance between pixel and source, and dx be the distance between source and sink. Then L=(ds/dx). Since dx>0 and ds>0, L>0 and 1/L<infinity.

The graph generation unit 135 then outputs a fully connected graph with weighted edges to segmentation unit 145 (S428).

FIG. 8 is a flow diagram illustrating operations performed by a segmentation unit 145 included in an image processing unit 30 for detection using weighted graph cuts according to an embodiment of the present invention illustrated in FIG. 2. A min-cut max-flow method may be used to segment the ROI by finding the cheapest cut (max flow) from the source node to the sink node and obtain an area of pectoral muscle in the ROI.

The min-cut max-flow algorithm uses the inter-pixel bond weights, the pixel-source, and pixel-sink bond weights to arrive at a segmentation of the ROI (S506) with a global maximum flow. The algorithm cuts edges (breaks bonds) between pixels belonging to different sets (classes). The output of segmentation unit 145 after performing the min-cut max-flow algorithm is a ROI in which pixels have been assigned to two sets (classes), with a set (class) of pixels representing the pectoral muscle, while another pixel set (class) is associated with other features of the ROI, such as the breast and the background.

Segmentation unit 145 may perform min-cut max-flow segmentation of the ROI using methods described in "An Experimental Comparison of Min-Cut/Max-Flow Algorithms for Energy Minimization in Vision", by Y. Boykov and V. Kolmogorov, IEEE Transactions on PAMI, v. 26 No. 9, pp 1124-1137, September 2004, the entire contents of which are hereby incorporated by reference. As discussed in the above publication, a cut C on a graph with two terminals is a partitioning of the nodes in the graph into two disjoint subsets S and T such that the source s is in S and the sink t is in T. Such a cut C is also knows as an s/t cut. The cost of a cut C={S,T} is defined as the sum of the costs of "boundary" edges (p,q) where p∈S and q∈T. The minimum cut problem on a graph is to find a cut that has the minimum cost among the possible cuts. In combinatorial optimization it has been shown that the minimum s/t cut problem can be solved by finding a maximum flow from the source s to the sink t. Using an analogy, a maximum flow is a maximum "amount of water" that can be sent from a source to a sink by interpreting graph edges as directed "pipes" with capacities equal to edge weights.

In the case of ROI from breast images showing the pectoral muscle, when the sink t is a pectoral muscle pixel, the subset T is the set (class) of pixels that belong to the pectoral muscle (S508). In that case, the source s is a background pixel, and the subset S is the set (class) of pixels that do not belong to the pectoral muscle, so subset S can include pixels from the breast, the background, etc.

Segmentation unit 145 next converts the segmented graph obtained (the graph together with the segmentation results) back to a mask image (S512), and outputs a binary image showing the pectoral muscle (S516). The binary image is sent to image restoration unit 155.

In alternative embodiments, segmentation unit 145 may segment the ROI using other energy minimizing functions besides, or instead of, a min-cut/max-flow segmentation.

Figure 9:
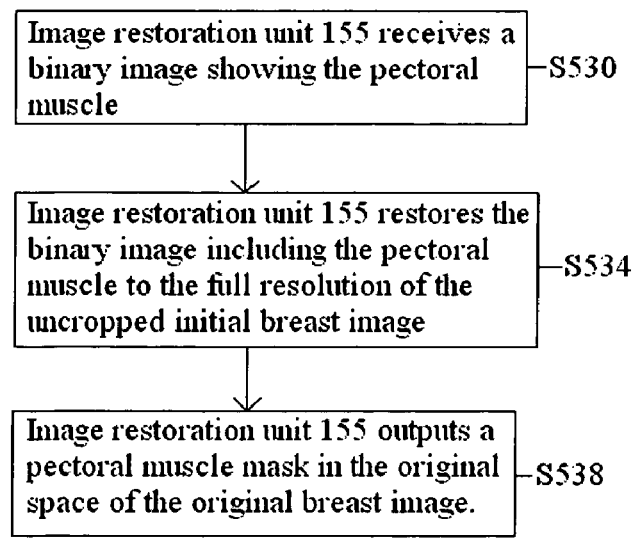
FIG. 9 is a flow diagram illustrating operations performed by a image restoration unit included in an image processing unit for detection using weighted graph cuts according to an embodiment of the present invention illustrated in FIG. 2.

FIG. 9 is a flow diagram illustrating operations performed by an image restoration unit 155 included in an image processing unit 30 for detection using weighted graph cuts according to an embodiment of the present invention illustrated in FIG. 2. Image restoration unit 155 receives from segmentation unit 145 a binary image showing the pectoral muscle. The binary image corresponds to the ROI that was extracted from the initial breast image. Image restoration unit 155 restores the binary image including the pectoral muscle to the full resolution of the uncropped initial breast image, and outputs a pectoral muscle mask in the original space of the original breast image. The results of image restoration unit 155 are sent to printing unit 40, image output unit 50, and/or display 60.

Although aspects of the present invention have been described in the context of mammography images, it should be realized that the principles of the present invention are applicable to other types of digital images besides mammography images, for detection of various other types of objects besides pectoral muscles.

Although detailed embodiments and implementations of the present invention have been described above, it should be apparent that various modifications are possible without departing from the spirit and scope of the present invention.

We claim:

1. An image processing method, said method comprising:
   accessing digital image data representing an image including an object;
   generating a connected graph associated with said image, said generating step including
      representing pixels of said image in a higher than two dimensional space to obtain pixel representations,
      generating a pixel representation graph using said pixel representations, and
      assigning weights to edges between said pixel representations in said pixel representation graph, based on a gradient characteristic between said pixel representations, to obtain a connected graph; and
   segmenting said connected graph using an energy minimizing function, to obtain pixels of said image associated with said object.

2. The image processing method as recited in claim 1, wherein said segmenting step uses a max-flow segmentation to obtain pixels of said image associated with said object.

3. The image processing method as recited in claim 1, wherein said sub-step of generating a pixel representation graph selects a source pixel from among pixels of said image not included in said object, and a sink pixel from among pixels of said image included in said object.

4. The image processing method as recited in claim 3, wherein said step of generating a connected graph further comprises:
   assigning strengths, based on a distance characteristic, to edges between
      said pixel representations in said pixel representation graph, a sink pixel representation associated with said sink pixel, and a source pixel representation associated with said source pixel.

5. The image processing method as recited in claim 4, wherein said image is a digital mammogram, said object is a pectoral muscle in said digital mammogram, said source pixel is a background pixel, said sink pixel is a pixel of said pectoral muscle.

6. The image processing method as recited in claim 1, wherein said step of generating a connected graph further comprises:

assigning strengths to edges between said pixel representations, based on a distance characteristic between said pixel representations.

7. The image processing method as recited in claim 1, wherein said step of generating a connected graph further comprises:

assigning prior pixel label likelihoods to said pixel representations in said connected graph.

8. The image processing method as recited in claim 1, further comprising:

preprocessing said image by resizing, smoothening, and diffusion filtering said image, before said step of generating a connected graph.

9. The image processing method as recited in claim 8, further comprising:

cropping from said image a region of interest associated with said object, before said step of generating a connected graph.

10. The image processing method as recited in claim 9, wherein said step of generating a connected graph and said segmenting step are performed for said region of interest to obtain a segmented region of interest.

11. The image processing method as recited in claim 10, further comprising:

integrating said segmented region of interest back into said image after said segmenting step, and restoring said image to original resolution.

12. The image processing method as recited in claim 1, wherein said sub-step of representing pixels represents pixels of said image using a parameter relating to a spatial characteristic of said pixels in said image, a parameter relating to an intensity characteristic of said pixels in said image, and a parameter relating to a distance characteristic of said pixels to a reference point.

13. The image processing method as recited in claim 1, wherein said image is a digital mammogram and said object is a pectoral muscle in said digital mammogram.

14. An image processing method, said method comprising:

accessing digital image data representing an image including an object;

generating a connected graph associated with said image, said generating step including representing pixels of said image to obtain pixel representations, generating a pixel representation graph using said pixel representations, and assigning weights to edges between said pixel representations in said pixel representation graph, based on a gradient characteristic between said pixel representations, to obtain a connected graph; and segmenting said connected graph using an energy minimizing function, to obtain pixels of said image associated with said object.

15. The image processing method as recited in claim 14, wherein said sub-step of generating a pixel representation graph selects a source pixel from among pixels of said image not included in said object, and a sink pixel from among pixels of said image included in said object, and said segmenting step uses a max-flow segmentation to obtain pixels of said image associated with said object.

16. The image processing method as recited in claim 15, wherein said step of generating a connected graph further comprises:

assigning strengths to edges between said pixel representations in said pixel representation graph, a sink pixel representation associated with said sink pixel, and a source pixel representation associated with said source pixel, based on a distance characteristic.

17. An image processing apparatus, said apparatus comprising:

an image data input unit for accessing digital image data representing an image including an object;

a graph generator for generating a connected graph associated with said image, said graph generator generating a connected graph by representing pixels of said image to obtain pixel representations, generating a pixel representation graph using said pixel representations, and assigning weights to edges between said pixel representations in said pixel representation graph, based on a gradient characteristic between said pixel representations, to obtain a connected graph; and a segmentation unit for segmenting said connected graph using a max-flow segmentation to obtain pixels of said image associated with said object.

18. The apparatus according to claim 17, wherein said graph generator selects a source pixel from among pixels of said image not included in said object, and a sink pixel from among pixels of said image included in said object for said pixel representation graph.

19. The apparatus according to claim 18, wherein said graph generator assigns strengths, based on a distance characteristic, to edges between said pixel representations in said pixel representation graph, a sink pixel representation associated with said sink pixel, and a source pixel representation associated with said source pixel.

20. The apparatus according to claim 19, wherein said image is a digital mammogram, said object is a pectoral muscle in said digital mammogram, said source pixel is a background pixel, said sink pixel is a pixel of said pectoral muscle.

21. The apparatus according to claim 17, wherein said graph generator assigns strengths to edges between said pixel representations, based on a distance characteristic between said pixel representations.

22. The apparatus according to claim 17, wherein said graph generator assigns prior pixel label likelihoods to said pixel representations in said connected graph.

23. The apparatus according to claim 17, further comprising:
an image operations unit for preprocessing said image by resizing, smoothening, and diffusion filtering said image, before said graph generator generates said connected graph.

24. The apparatus according to claim 23, further comprising:
a cropping unit for cropping from said image a region of interest associated with said object, before said graph generator generates said connected graph.

25. The apparatus according to claim 24, wherein
said graph generator generates a connected graph for said region of interest, and
said segmentation unit segments said connected graph for said region of interest to obtain a segmented region of interest.

26. The apparatus according to claim 25, further comprising:
an image restoration unit for integrating said segmented region of interest back into said image after said segmenting step, and restoring said image to original resolution.

27. The apparatus according to claim 17, wherein said graph generator represents pixels of said image in a higher than two dimensional space using a parameter relating to a spatial characteristic of said pixels in said image, a parameter relating to an intensity characteristic of said pixels in said image, and a parameter relating to a distance characteristic of said pixels to a reference point.

28. The apparatus according to claim 17, wherein said image is a digital mammogram and said object is a pectoral muscle in said digital mammogram.

* * * * *